UNITED STATES PATENT OFFICE.

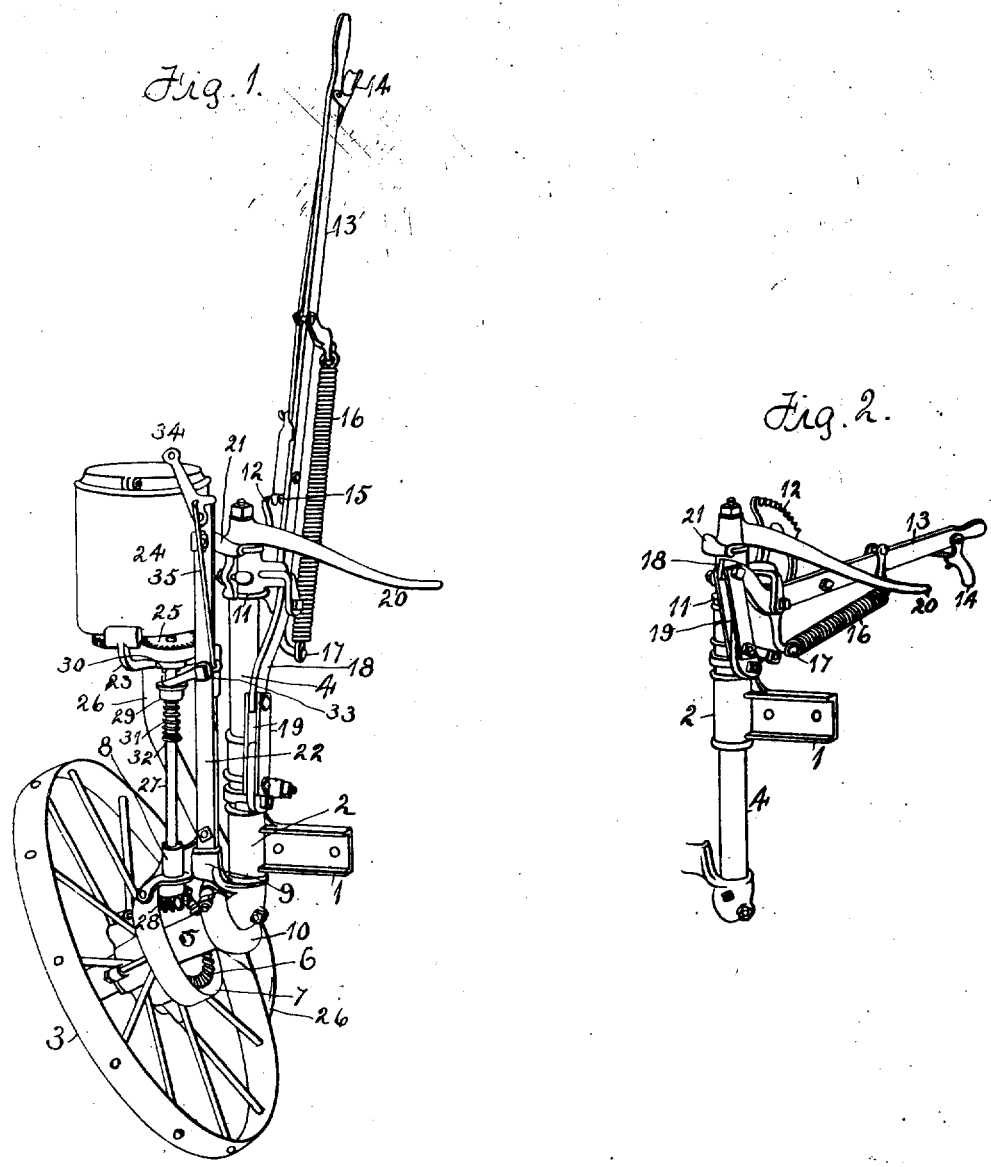

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

PLANTING ATTACHMENT.

No. 903,118.      Specification of Letters Patent.      Patented Nov. 3, 1908.

Application filed January 7, 1908. Serial No. 409,690.

*To all whom it may concern:*

Be it known that I, LEWIS E. WATERMAN, a citizen of the United States, residing at Rockford, in the county of Winnebago and State of Illinois, have invented certain new and useful Improvements in Planting Attachments, of which the following is a specification.

The object of this invention is to support a planting attachment with relation to the front furrow wheel of a plow, so that the relation between the wheel and planting attachment will always remain the same during the castering movements of the plow.

In the accompanying drawings Figure 1 is a perspective view of the front furrow wheel of a plow and my improved planting attachment in connection therewith, and in which the frame is lowered. Fig. 2 is a perspective view of the furrow wheel support, in which the frame is elevated.

In the drawings I have not deemed it necessary to show the complete plow, as such construction is well known. The forward end of the frame of the plow is intended to connect with the bracket 1 having the vertical tubular section 2.

A front furrow wheel 3 is loosely mounted on its support 4 so as to turn independent of the support. This support is located in the tubular section 2 of the bracket 1.

To the hub 5 of the furrow wheel is fixedly connected a toothed wheel 6 which is protected by a casing 7. To the casing 7 is connected a bearing 8, and a bracket 9. The bracket has a connection with the sand-cap 10 secured around the hub of the furrow wheel.

To the upper end of the furrow wheel support 4 is clamped a bracket 11 which has a toothed segment 12 connected to it. A hand lever 13 has a pivotal connection with the toothed segment 12 and is provided with the usual thumb-lever 14 and dog 15 for engagement with the toothed-segment. A spring 16 has one end connected to the hand-lever 13 and its other end to a projection 17 extending from the bracket 11. The hand-lever 13 has an extension 18 projecting beyond its pivotal point, and to the free end of which are pivoted two links 19, and the free ends of these links are pivotally connected to the upper portion of the tubular section 2 of the bracket 1.

By means of the hand-lever 13 the bracket 1 is moved along the furrow wheel support 4 and can be held in its adjusted position by locking the hand-lever in connection with the toothed-segment 12. As the forward portion of the frame of the plow is connected to the bracket 1 it will be raised and lowered.

To the upper end of the furrow wheel support 4 is fixedly connected a lever 20 by which the furrow wheel may be turned in turning the plow at corners of the field.

From the bracket 11 extends an arm 21 to which is connected a bar 22, and the lower end of this bar is connected to the bracket 9.

To the bar 22 is connected a support 23 for the seed box 24 and also for the seed dropping mechanism which is operated by the gear wheel 25. From the seed box support extends a discharge spout 26, its lower end being located in rear of the furrow wheel 3 and close thereto.

A shaft 27 is supported in the bearing 8 and the seed box support 23 and the upper end of which has the gear wheel 25 loosely mounted thereon. To the lower end of the shaft 26 is secured a beveled toothed pinion 28, which meshes with the toothed-wheel 6 connected to the hub of the furrow wheel. The hub of the toothed wheel depends through the support for the wheel and is in clutch form.

To the shaft is slidably connected a clutch-section 29 which is held in engagement with the clutch face 30 by the spring 31 having one end resting against a collar 32 secured to the shaft 27.

To the bar 22 is pivoted a fork 33 which rests against the clutch section. A lever 34 has a pivotal connection with the upper end of the bar 22, and a rod 35 forms a connection between the lever 34 and fork 33.

By means of the lever 34 the fork 33 can be moved to operate the clutch section 29 to hold the clutch section free of the clutch face in order that the seed dropping mechanism will remain inoperative, or permit the spring 31 to move the clutch section into engagement with the clutch face thereby forming a connection between the shaft and seed dropping mechanism.

In use the seed dropping mechanism is operated by the rotations of the furrow wheel rotating the shaft 27 and it in turn moving the seed dropping mechanism.

As the seed dropping mechanism, seed discharge spout and driving mechanism are supported by the furrow wheel and its support, any castering movement of the furrow wheel will carry these parts with it, so that their relations always remain the same, and a positive driving connection is formed between the furrow wheel and the seed dropping mechanism by the shaft 27.

By locating the shaft 27 centrally over the hub of the furrow-wheel, the construction is made more compact, and is removed from interference with the earth thrown up by the plow.

I claim as my invention—

1. A planting attachment for plows, comprising a furrow-wheel capable of a castering movement in its connection with the main frame, a seed-box, and a seed-dropping mechanism supported to move with the furrow wheel.

2. A planting attachment for plows, comprising a furrow-wheel capable of a castering movement in its connection with the main frame, a seed-box, seed-dropping mechanism and a seed-discharge spout supported to move with the furrow-wheel.

3. A planting attachment for plows, comprising a furrow-wheel, a furrow-wheel support capable of a castering movement in its connection with the main frame, a bar supported by the furrow-wheel support, a seed-box, seed-dropping mechanism and seed-discharge spout supported by the bar, and a driving connection between the seed-dropping mechanism and furrow-wheel.

4. A planting attachment for plows, comprising a furrow-wheel, a furrow-wheel support capable of a castering movement in its connection with the main frame, a seed-box, seed-dropping mechanism and seed discharge spout supported by the furrow-wheel support, a shaft for rotating the seed-dropping mechanism, and a gear connection between the shaft and furrow-wheel.

5. A planting attachment for plows, comprising a furrow-wheel, a furrow-wheel support capable of a castering movement in its connection with the main frame, a seed-box, seed dropping mechanism and seed discharge spout supported by the furrow-wheel support, a shaft for rotating the seed-dropping mechanism, and a gear connection between the shaft and furrow-wheel, the shaft located centrally over the hub of the furrow-wheel.

6. A planting attachment for plows, comprising a furrow wheel, a furrow wheel support capable of a castering movement in its connection with the main frame, a seed-box, seed dropping mechanism and seed spout supported by the furrow wheel support, a shaft for rotating the seed dropping mechanism, a clutch connection between the shaft and seed dropping mechanism, and a gear connection between the shaft and furrow-wheel.

In testimony whereof I have hereunto set my hand in presence of two subscribing witnesses.

LEWIS E. WATERMAN.

Witnesses:
A. O. BEHEL,
E. D. E. N. BEHEL.